United States Patent [19]

Ross, Sr. et al.

[11] Patent Number: 4,712,327
[45] Date of Patent: Dec. 15, 1987

[54] AERATED LIVE WELL

[76] Inventors: Ron S. Ross, Sr., P.O. Box 304, (Rte. 5); Claude W. Goff, Sr., P.O. Box 292, (Rte. 5), both of Manning, S.C. 29102

[21] Appl. No.: 11,324

[22] Filed: Feb. 5, 1987

[51] Int. Cl.$^4$ ............................................. A01K 97/04
[52] U.S. Cl. ........................................................ 43/57
[58] Field of Search ..................... 43/57, 56; 261/121.2

[56] References Cited

U.S. PATENT DOCUMENTS

| | | | |
|---|---|---|---|
| 1,568,730 | 1/1926 | Gleason | 43/57 |
| 2,736,983 | 3/1956 | Hostetter | 43/57 |
| 2,767,509 | 10/1956 | Breithaupt | 43/57 |
| 2,863,255 | 9/1958 | Slipka | 43/57 |
| 3,191,337 | 6/1965 | Fant | 43/57 |
| 3,334,438 | 8/1967 | Fellers | 43/56 |
| 3,348,330 | 10/1967 | Gilliam | 43/57 |
| 3,972,145 | 8/1976 | Key | 43/57 |
| 4,037,349 | 7/1977 | Key | 43/57 |

Primary Examiner—Gene P. Crosby
Attorney, Agent, or Firm—F. Rhett Brockington

[57] ABSTRACT

An aerated live well consisting of a double walled vessel where the inner chamber formed by the walls can be filled with ice for the purposes of cooling the water in the vessel, and/or the inner chamber can be filled with pressurized air via an air pump, having a wide mouth inlet into the inner chamber through which the ice can be added, for the purposes of generating a reservoir of air which is diffused into the water in the vessel; where the combination of diffused air and cooling ice serves to substantially extend the life expectancy of the bait contained in the said aerated live well.

6 Claims, 4 Drawing Figures

AERATED LIVE WELL

This invention relates to an aerated live well, and more specifically to an aerated live well which can be cooled. Additional features of the invention are that aeration is accomplished with only infrequent use of a hand pump and that the well is constructed from mouldable thermoplastic materials which have been demonstrated to have long service lives at a modest cost.

Examples of various forms of aerating bait buckets are Nos. 3,191,337, 3,972,145, 3,348,330, 1,568,730, 4,037,349, 2,863,255, 3,334,438 and 2,767,509.

BRIEF DESCRIPTION OF THE INVENTION

The aerated live well (or bait bucket) is a double walled container where the space between the walls (inner wall chamber) is used to hold pressurized air which is diffused into the bottom of the well. The space in the inner wall chamber has been made sufficiently large that it takes several hours for all of the air to trickle out even at modest internal pressures. An upper pressure limit of 20 psi is anticipated. A pin hole orifice and/or a needle valve connected to the chamber controls the flow rate of air. The chamber is pressurized using a hand pump with a pressure relief valve.

The applicants found in their research of aerated live wells that aeration alone did not insure that the bait would remain lively for extended periods of time, particularly if the ambient temperature was hot and/or if the sunlight was intense. Their assessment of this observation led them to add ice to the water in the well thus lowering the temperature of the water which in turn elevates the saturation point of dissolved oxygen in water. However, the addition of ice to the live well water was found to be less than a satisfactory solution to the problem of increasing the utilizable oxygen available to the bait. On really hot days the ice melts so fast that the live well requires nearly constant attention to keep it refurbished, but not flushed with ice. Also the floating ice makes it more difficult to pick up the bait, and one never knows exactly how much chlorine will be present in the ice. It varies from region to region. Potable ice dilutes salt water and so is unsatisfactory for any saline applications.

If the entire aerated live well is placed in ice a partial solution is affected, however, the bucket tends to move around a lot, and the insular nature of the double-walled container makes cooling very inefficient.

A very satisfactory solution to the cooling problem was arrived at by the inclusion of ice into the compressed air chamber. Ice, particularly that in direct contact with the inner wall, serves to efficiently cool the well water without having any adverse side effects as previously enumerated. Also there is not a marked reduction of air capacity because the cold temperature of the inner chamber, would, as predicted by the Gas Laws, increase the density of the air (at a given pressure), therein allowing more weight air for a given volume.

A feature of the instant invention is that the aerated live well is designed such that ice may easily be introduced to the compressed air chamber, and that water can be easily drained from the compressed air chamber.

Another feature of the invention is that the double walled container be constructed of a durable, impact resistant, mouldable thermoplastic material such as ABS, PVC, Polyurethane, Polycarbonate, Polycaprolactam, etc. In addition to the fact that a double walled container could be fashioned from just two moulds, one for the outer wall container and one for the inner wall container, using manufacturing methods having high outputs, thermoplastics do not rust and generally have relatively long performance lifetimes. High outputs and a small assemblage of components should work to generate a high quality product at a modest cost.

DETAILED DESCRIPTION OF THE ILLUSTRATED EMBODIMENT

Figure 1:
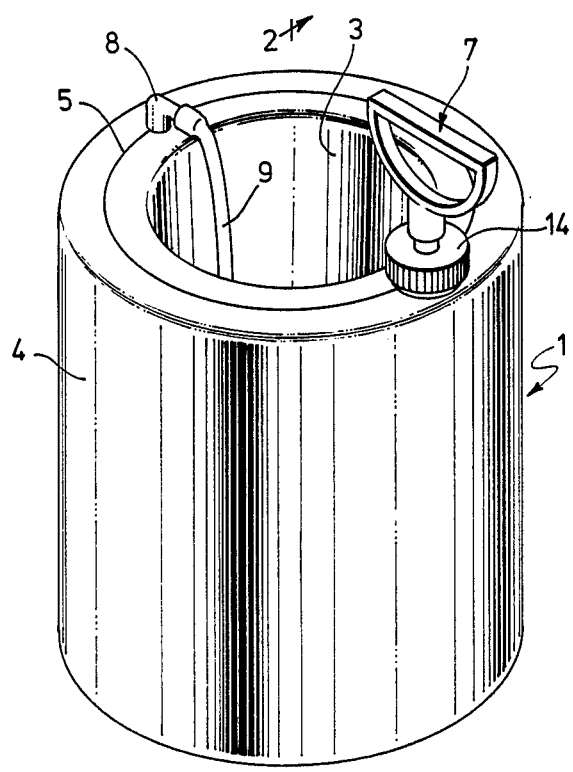
FIG. 1 is a perspective view of a preferred form of the aerated live wall constructed in accordance with the present invention.
Figure 2:
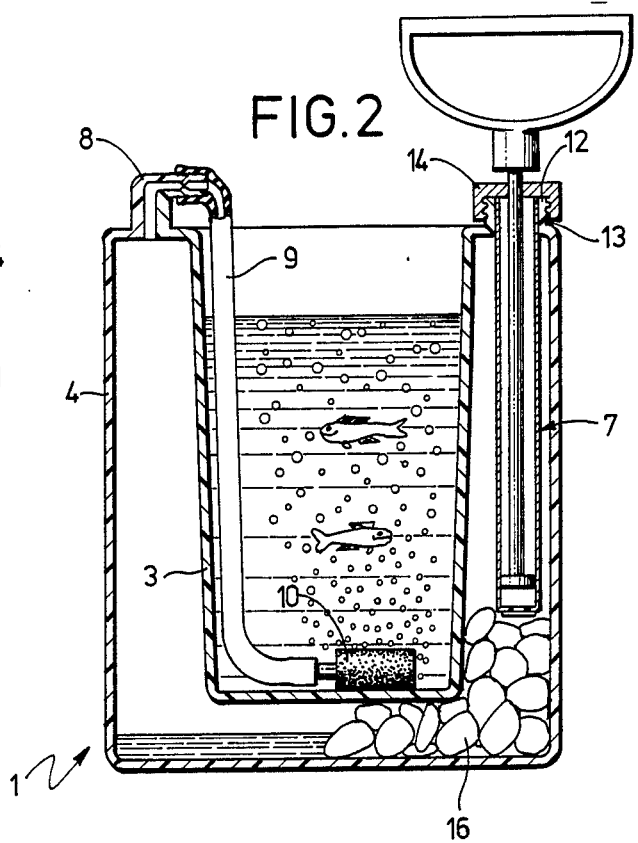
FIG. 2 is a vertical sectional view taken substantially upon the plane indicated by the section line 2—2 of FIG. 1.

Referring now more specifically to the drawings the number 1 generally designates the aerated live well of the instant invention, which is a double-walled container. In FIG. 1, the double-walled container 1 is formed by joining and sealing an outer wall container 4 an an inner wall container 3. They are joined at the seam 5. The junction of these two containers 3 and 4 creates an inner wall chamber 6 which can be pressurized using a hand pump 7. Referring now to FIG. 2 which is a vertical sectional view taken substantially upon the plane indicated by the section line 2—2 of FIG. 1. The hand pump 7 is used to pressurize the inner wall chamber 6 with air which trickles out of the chamber 6 through a pin hole orifice nipple 8 through a tube 9 to an air diffusion stone 10 located at the bottom of the inner wall container 3. The inner wall container 3 has a rounded bottom, straight sides and an upper flanged lip 11 which flares outward along the perimeter of the container. The symmetry of the inner wall perimeter is interrupted to form one-half of the semicircular threaded stem 12 which the pump cap 14 screws onto. The outer wall container 4 forms the balance of the circular opening at 13. The outer wall container is substantially cylindrical in shape, having a flanged upper lip 15 which curves inward. The seam 5 joins flanges 11 and 15. Ice 16 can be added to the inner wall chamber 6 through the orifice formed by 12 and 13 by simply temporarily removing the pump 7.

Figure 3:
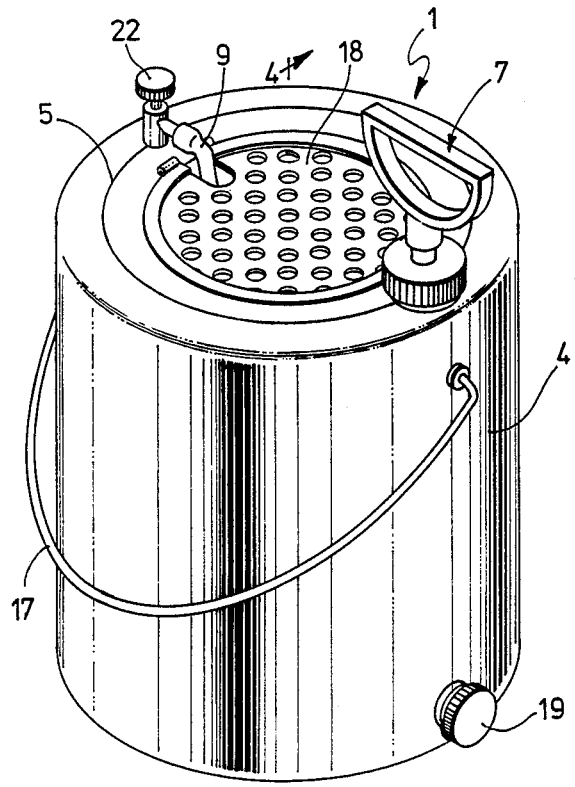
FIG. 3 is a perspective view of a preferred embodiment which is portable.
Figure 4:
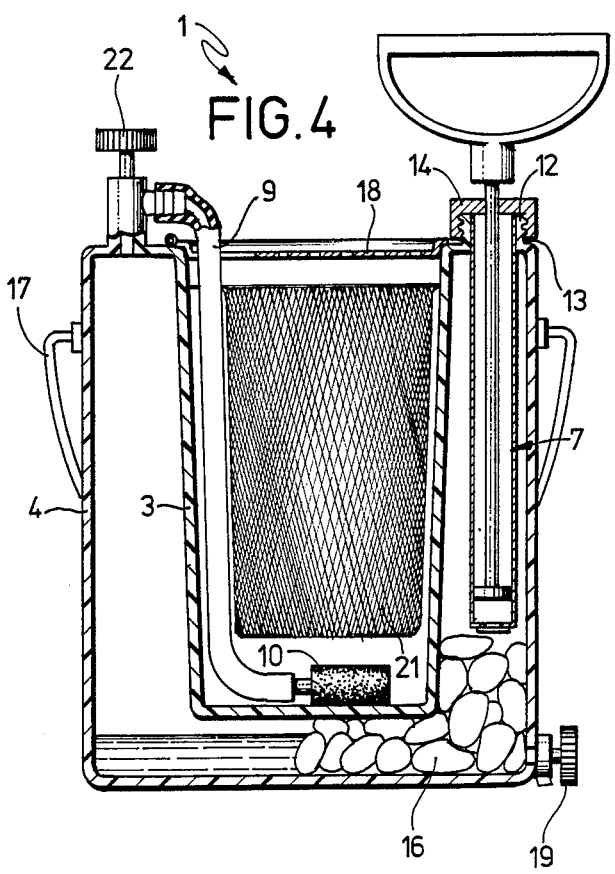
FIG. 4 is a is vertical sectional view taken substantially upon the plane indicated by the section line 4—4 in FIG. 3.

Referring now to FIG. 3. The aerated live well 1 has been fitted with a handle 17 to make it more easily carried. The top of 1 has been fitted with a lid 18, and obstructed from view in the well is a basket 21 for isolating the bait in a minimum depth of water. A drain valve 19 has been added to drain off water from the inner wall chamber 6. The pin hole orifice nipple 8 is fitted with a needle valve 22 for regulation of the flow of air through the nipple B. FIG. 4 is a sectional view of FIG. 3, and illustrates the basket 21, the drain valve 19, as well as the other components depicted in the previous drawings.

What we claim is:

1. An aerated live well comprised of a moulded, thermoplastic, double walled container;

which is formed by joining and sealing a flanged lip of an inner wall container with a flanged lip of an outer wall container said inner wall container being substantially bucketshaped having a curved or parabolic bottom, straight vertical or slanted sides and a flanged upper lip which flares outward, a portion of the lip arching upward forming a semi-circular threaded stem, said outer wall container being substantially cylindrical in shape having a flat enclosed bottom, vertical sides and an inward flanged upper lip, a portion of the lip arching upward forming the balance of the semicircular threaded stem, a hand pump which screws onto the said threaded stem, the bulk of the pump projecting downward through the orifice of the stem into the inner wall chamber, said hand pump forcing pressurized air into the inner wall chamber and can on occasion be removed temporarily to add ice through the stem orifice to the inner wall chamber;

a pin point hole nipple which penetrates into the inner wall chamber and is affixed to the upper third of the double walled container, through which air flows;

and a section of tubing that is connected to the said nipple on one end and an air diffusion stone on the other, said stone resting on or near the bottom of the well;

which when filled with water and pumped up with air will provide a hospitable environment for bait for a number of hours.

2. An aerated live well as claimed in claim 1 that has a lid.

3. An aerated live well as claimed in claim 1 that has a carrying handle.

4. An aerated live well as claimed in claim 1 that has a needle valve on the said nipple to control the flow of air.

5. An aerated live well as claimed in claim 1 with a removable drain bucket which allows the fisherman to isolate the bait in a minimum amount of water.

6. An aerated live well as claimed in claim 1 with a water drain valve located near the bottom of the outer wall container and penetrating into the inner wall chamber.

* * * * *